United States Patent [19]
Ewan et al.

[11] 3,912,469
[45] Oct. 14, 1975

[54] APPARATUS FOR THE REMOVAL OF CONTAMINANTS FROM GAS STREAMS

[75] Inventors: Thomas K. Ewan, Daingerfield; Malley R. Bass, Longview, both of Tex.

[73] Assignee: Lone Star Steel Company, Dallas, Tex.

[22] Filed: Sept. 11, 1974

[21] Appl. No.: 505,064

[52] U.S. Cl. ...................... 55/238; 55/349; 55/418; 55/263; 261/79 A; 209/144; 210/512 M
[51] Int. Cl.² ......................................... B01D 47/10
[58] Field of Search ....... 55/92, 226, 237, 238, 257, 55/263, 418, 468, 346, 349, 344, 84, 235, 236, 459; 261/79 A; 209/144, 211; 210/512 M

[56] References Cited
UNITED STATES PATENTS

| | | | |
|---|---|---|---|
| 467,264 | 7/1892 | Raymond | 55/92 |
| 495,359 | 4/1893 | McClave | 55/263 |
| 798,287 | 8/1905 | Lawton et al. | 55/468 X |
| 1,844,369 | 2/1932 | Ross | 55/418 X |
| 1,859,010 | 5/1932 | Stratford | 55/418 |
| 1,961,956 | 6/1934 | Bleibtreu et al. | 55/226 |
| 2,604,185 | 7/1952 | Johnstone et al. | 55/238 X |
| 2,904,130 | 9/1959 | Chapler, Jr. | 55/344 |
| 2,935,375 | 5/1960 | Boucher | 55/238 X |
| 3,218,047 | 11/1965 | Calaceto | 55/238 X |
| 3,696,590 | 10/1972 | Richmond | 55/238 |

Primary Examiner—Frank W. Lutter
Assistant Examiner—David L. Lacey
Attorney, Agent, or Firm—Donald E. Degling; James D. Bock

[57] ABSTRACT

An apparatus is disclosed for the removal of contaminants comprising solid or liquid particulate matter or acidic gases from gas streams in which the gas stream is driven through an elongate mixing tube and turbulently mixed with atomized water droplets whereby the particulate matter is captured by the water droplets. Sufficient retention time is provided in the mixing tube so that the water droplets attain a size which permits separation by centrifugal means. Velocity and pressure control means are located between the exit end of the mixing tube and the entrance to the centrifugal separating means to provide an optimum velocity and distribution of the mixture of water droplets and gas relative to the centrifugal separating means. If it is desired to remove acidic gases from the gas stream, an appropriate alkaline reagent may be introduced into the water prior to atomizing the water droplets.

2 Claims, 6 Drawing Figures

APPARATUS FOR THE REMOVAL OF CONTAMINANTS FROM GAS STREAMS

The present invention provides an improved apparatus for the removal of contaminants comprising solid or liquid particulate matter or acidic gases from gas streams.

BACKGROUND OF THE INVENTION

The present invention relates, in general, to the field of air pollution and more particularly to an improved apparatus for the removal of particulate matter or acidic gases from gas streams. In accordance with the present invention, the apparatus may be designed to accommodate a relatively large variation in the mass or volume rate of flow of the gas stream to be cleaned without a substantial loss in contaminant removal efficiency. The invention herein will be disclosed in relation to the steam ejector gas cleaning system described in the pending Martin et al. application Ser. No. 302,608 filed Oct. 31, 1972 now U.S. Pat. No. 3,852,409 and assigned to the assignee of this application.

The Martin et al. application discloses a method and apparatus for driving and cleaning a gas stream wherein the driving function is provided by a steam-jet ejector and the cleaning function is preferably provided by unheated and untreated water injected into the jet of steam exiting from the steam ejector nozzle and flowing into a properly proportioned mixing tube located adjacent to, but downstream from, the exit end of the steam ejector nozzle. As gas cleaning is enhanced by the use of a large number of small high velocity droplets of water or other liquid cleaning medium, water used for the cleaning function is first passed through atomizing nozzles and is then further atomized by the action of the steam jet on the atomized droplets.

The small high velocity droplets formed by the double atomization process described above impact upon the particulate matter which may be contained in the gas stream and the particulate matter thereupon becomes encapsulated by the water droplets. Depending upon the conditions of temperature and pressure existing within the mixing tube, the particulate matter and the droplets of water may also serve as nucleation sites for the condensation of steam.

It will, of course, be appreciated that the contaminants within a gas stream may comprise solid particulate matter, liquid droplets or gaseous matter. Solid particulates and liquid droplets may both be encapsulated by the impaction process within relatively larger droplets of water. For this reason, the term "particulates" or "particulate matter" will be used hereafter to comprehend both solid particulates and liquid droplets which constitute contaminants in a gas stream. The gaseous contaminants which may be present in the gas stream may include gases which are soluble to some extent in water or the liquid cleaning medium employed. Such gases, to the extent of their solubility in the cleaning medium, will become dissolved in the water droplets and removed as described hereafter.

Gaseous contaminants which are acidic in nature effectively may be removed through chemical reaction between appropriate reagents added to the water prior to atomization and the acidic gases. It has been found that acidic gases such as sulfur dioxide effectively may be removed by the use of such alkaline chemical reagents as calcium oxide, calcium hydroxide, sodium carbonate, sodium hydroxide, ammonium hydroxide or combinations of some of these reagents. Similarly, organic odors may be removed by adding an appropriate oxidizing agent, such as potassium permanganate to the water prior to atomization. The chemical reactions between the acidic gases and alkaline agents are set forth in the Ewan et al. pending application Ser. No. 291,007 now U.S. Pat. No. 3,852,408 also assigned to the assignee of this application.

As set forth in the Martin et al. application referred to above, the steam jet exiting from the steam nozzle impacts against the inner periphery of the mixing tube in a zone known as the "hook-up" zone and an effective steam ejector pump is formed which functions to drive the system. The steam exits from the nozzle at supersonic velocities but, during the course of its travel down the mixing tube, the velocity of the steam and water mixture becomes subsonic. As a result, a highly turbulent mixing zone characterized by normal and oblique shock waves is established within the mixing tube.

Within the mixing tube the liquid cleaning medium, which may be water alone or water to which one or more chemical reagents have been added to form a solution, suspension or slurry, is first atomized into small droplets and accelerated to high velocities by the steam jet. Within the turbulent mixing zones, the small high velocity droplets impact against the liquid or solid particulate which may be contained in the gas stream and collide with one another to form larger drops of particulate-containing liquid. Such larger liquid droplets will also contain the reaction products of the chemical reagents added to the water and any acidic gaseous contaminants which may be present in the gas stream. In addition to the process of impaction or collision resulting from velocity differences among the droplets and between the droplets and the gaseous and vapor phases of the turbulent mixture, temperature conditions may be such as to promote condensation of steam and water vapor to form additional droplets or to enlarge existing droplets or to promote coalescence of the water droplets. In this regard, it may be noted that particulate matter, whether solid or liquid, is well suited to provide nucleation sites for condensation of droplets.

The mixing tube is designed to provide for the formation of particulate and reaction product — containing droplets of a size and velocity suitable for separation by centrifuging in a low pressure drop cyclone. Within the cyclone, the contaminant-containing water droplets are separated from the gas. The cleaned gas is exhausted to the atmosphere while the contaminant-containing water may be reclaimed after suitable treatment for reuse in the process or otherwise.

In practice, the steam ejector cleaning system has been built in modular form, each module capable of handling, for example, a gas flow of 1000 pounds per minute. Of course, modules of almost any size can be built. Systems based on modules ranging in size from 100 pounds per minute up to 2000 pounds per minute have been constructed. Thus, it is possible to design a system utilizing the ejector principle for any gas flow desired.

However, despite the fact that controls may be designed to activate or deactivate modules as the volume or mass flow rate of gas to be treated varies, the modular system allows only a relatively rough stepwise control of the process. It is therefore an object of the present invention to provide means to accommodate, without loss of efficiency, variations in the flow rate or the composition of the gas stream being treated.

It has also been found in a number of installations that future expansion of the industrial or chemical process giving rise to the contaminated gas steam may be contemplated. While it is sometimes possible to provide additional modules for the gas cleaning system, there is usually an optimum size and number of modules for each system. The optimum size and number of modules is determined, inter alia, from considerations of capital cost, system availability, maintenance and complexity of controls. In general, the capital cost, maintenance cost and complexity of the control system increases as the number of modules increase. It is another object of the present invention to provide a gas cleaning system which can accommodate an expansion of the gas generating facility without the use of additional modules of gas cleaning equipment.

It is still a further object of the present invention to provide new and improved techniques and apparatus to increase the efficiency of the mixing tube and cyclone in the formation and removal of the contaminant-containing liquid cleaning medium from the cleaning system.

These and other objects of this invention will be apparent to those skilled in the art from a consideration of this entire disclosure, including the accompanying drawings.

SUMMARY OF THE INVENTION

The objectives of the present invention are accomplished broadly by providing means for controlling and directing the flow of the mixture of gases, vapors and droplets within the mixing tube so as to provide an optimum velocity, droplet size and distribution of the mixture relative to the cyclone separators. When these conditions are met, the cyclone separators are enabled to operate at a maximum efficiency.

In one embodiment of the invention, a steam ejector cleaning system employing a cylindrical mixing tube is disclosed. The cylindrical mixing tube is desirable from the standpoint of symmetry in combination with the concentric and axial steam ejector nozzle to provide a simple and efficient driving and mixing apparatus. However, while turbulence and concomitant mixing are desirable and necessary functions of the mixing tube, the opposite situation obtains in the cyclone where the object is to separate the liquid and gaseous or vaporous components of the gas-liquid mixture emitted from the mixing tube.

The efficiency of the cyclone is enhanced by delivering the gas-liquid mixture as uniformly as possible in a directionalized manner so that an essentially laminar thin layer is directed tangentially to the cylindrical surface of the cyclone.

As a cyclone utilizes the principle of centripetal force, it is essential, to maximize its efficiency, to deliver the gas mixture at high velocity and as close to the cyclone inner wall as possible. However, excess velocities should be avoided since such velocities can be obtained only at the expense of considerable energy and therefore lower the total system efficiency. The ability of a cyclone to separate components of a mixture is a function of the relative mass of each component, the velocity of the mixture, the cyclone diameter and the effectiveness of the cyclone entry.

In the present invention, the difference in relative mass is provided in the mixing tube where droplet growth is promoted to provide a maximum droplet size consistent with the efficient utilization of energy. During passage through the mixing tube, the inter-droplet collisions together with condensation phenomena promote an increase in droplet size and hence mass ratio relative to the gas phase of the mixture. However, this increase in droplet size results in an expenditure of energy which is evidenced by a decrease in mixture velocity. This is enhanced by the frictional losses which are inherent in the flow of fluid through a conduit. According to the present invention, means are provided adjacent the exit of the mixing tube to control the velocity of the mixture to provide an optimum velocity at the cyclone. These means also control the pressure at the cyclone entrance which determines the location of the hook-up zone in the mixing tube which, in turn, establishes the droplet size at the cyclone entrance.

The cyclone diameter is normally determined on the basis of the mass rate of flow which it is required to handle. However, though the cyclone size may be established, the maximum utilization of the cyclone depends also on the manner in which the mixture is delivered to the cyclone. In recognition of this, it is known to deliver the mixture in a tangential direction to the cyclone wall. In accordance with the present invention, the path or flow of the gas is further modified from a cylindrical pattern to a directionalized layer having its narrow dimension in cross section normal to the cyclone wall so that the mixture is, in effect, laid on the cyclone wall whereby the liquid phase of the mixture will reach the cyclone wall to be captured thereby in a minimum time. The thickness of this directionalized layer, varied as shown herein, allows a substantial degree of control over the separation and flow capacity characteristics of the cyclone. The invention also provides means for reducing the turbulence of the flow in the mixture and increasing its directional characteristic so as to improve further the performance of the cyclone.

The invention will now be described in greater detail in conjunction with the accompanying drawings.

DESCRIPTION OF THE PREFERRED EMBODIMENTS

Figure 1:
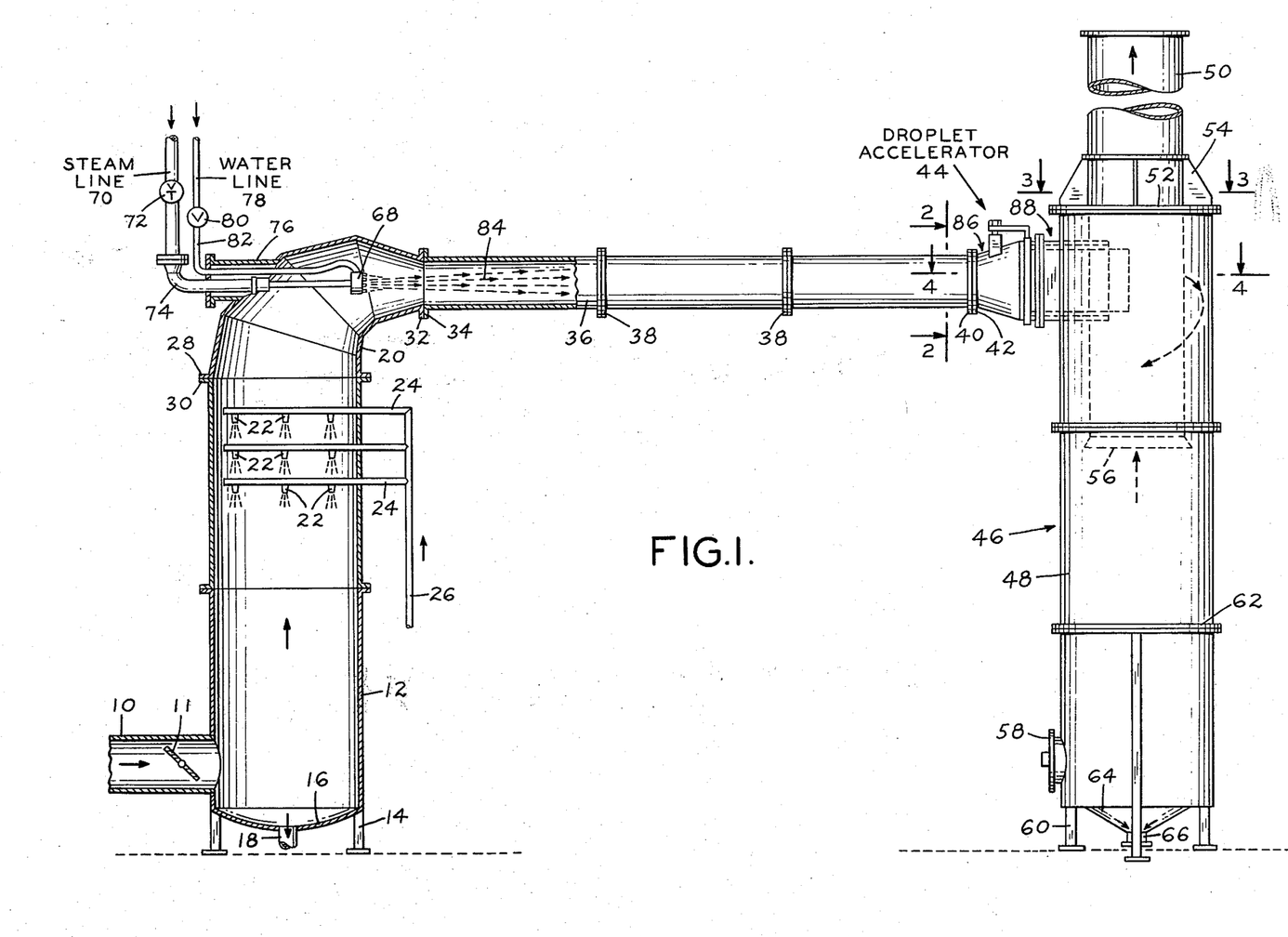
FIG. 1 is an elevational view, partly in section of a steam ejector gas cleaning system including the droplet accelerator and improved cyclone entry of the present invention.
Figure 2:
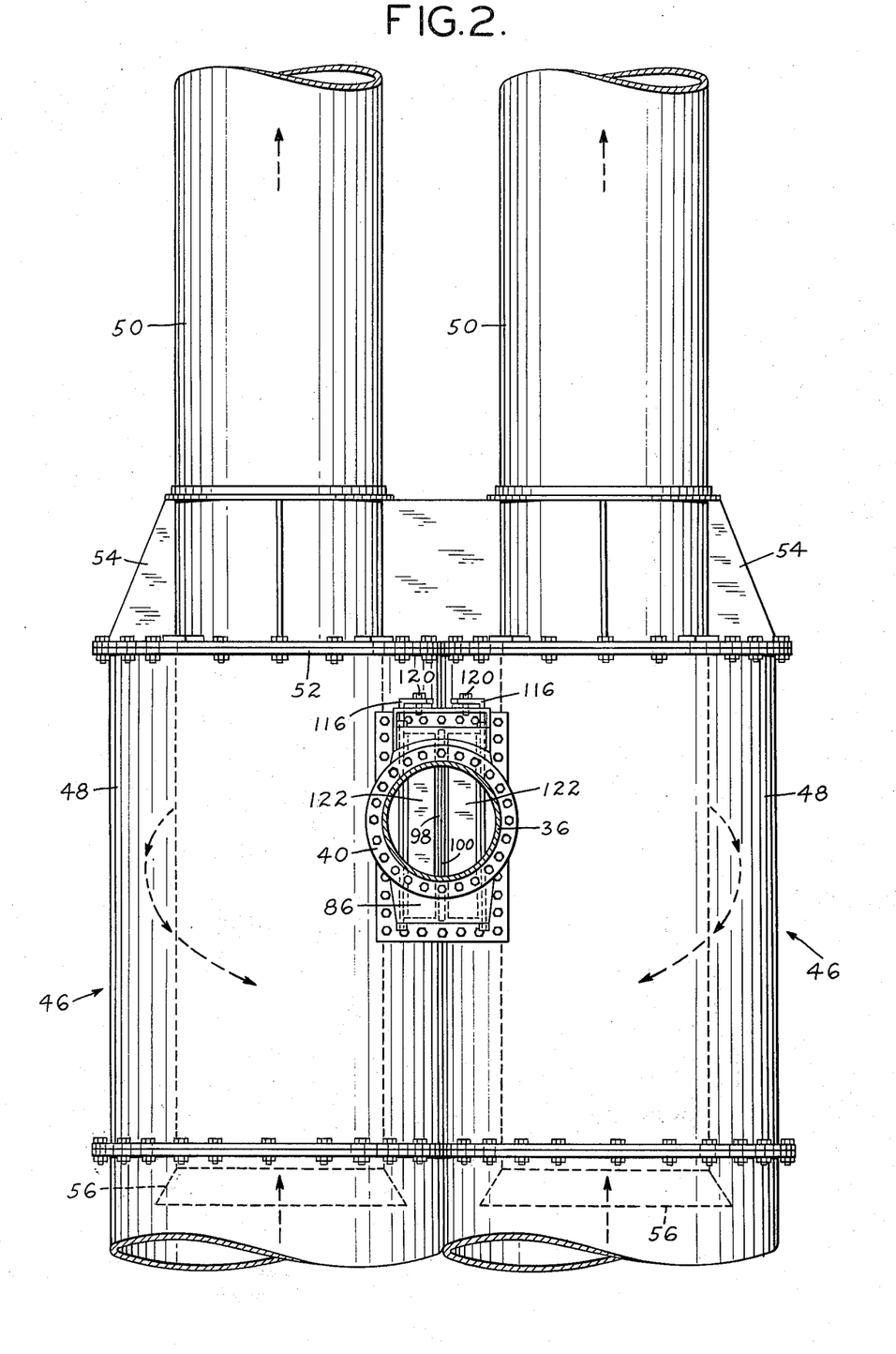
FIG. 2 is a partial elevational view of the improved steam ejector cleaning system showing a portion of the cyclones and the droplet accelerator taken along line 2—2 of FIG. 1.

Referring now to the drawings and more particularly to FIG. 1, a general description of the steam ejector cleaning system will be provided. The duct through which the contaminated gas stream enters the system is indicated by the designator 10. If the gas to be treated is at an elevated temperature it may be desirable to pass the gas stream through a heat exchanger (not shown) both to reduce its volume and temperature and also to take advantage of the sensible heat of the gas stream to form steam, including that steam required to operate the system as described below. The entry duct 10 may be provided with a damper 11 to control the flow of contaminated gas into the cleaning system and assist the start-up of the ejector pump.

The entry duct 10 communicates with the lower end of an atomizer chamber 12 mounted on legs 14 and having a spherical or conical bottom 16 fitted with a suitable drain 18 which communicates with the slurry disposal and treatment system (not shown). The atomizer 12 is generally in the form of an upright cylinder which communicates at the upper end with an atomizer head 20. In the upper portion of the atomizer 12 there may be positioned a number of nozzles 22 mounted on manifolds 24 connected to the atomizer supply duct 26. The function of the atomizer is to precondition and preclean the entering gas stream. In the process of rising through the atomizer 12, many of the large particulates entrained in the gas stream will tend to drop out of the stream and may be removed through the drain 18. The liquid spray from the nozzles 22 will humidify the gas stream and, if the stream is at an elevated temperature, there will be a proportional amount of cooling and a reduction in the volume of the gas to be handled by the balance of the system.

It is believed also that within the atomizer a process of thermophoresis occurs which results in the agglomeration of some of the particulate into larger masses. While it is contemplated that the liquid supplied to the nozzles 22 will ordinarily be industrial grade water, it is, of course, possible to add reagents, such as lime, caustic or ammonia to the water to enable the removal of some of the acidic gases such as sulfur dioxide which may be contained in the contaminated gas. The atomizer is essentially a preconditioner of the gas stream and, while useful, may not be essential in all systems. For example, in situations where the gas stream is not at elevated temperatures and the principal contaminant is particulate matter which does not include submicron sized particles, it may be economically feasible to dispense with the atomizer and direct the gas stream from the entry duct 10 into the atomizer head 20.

As shown in FIG. 1, the atomizer head 20 is formed generally as a reducing elbow having an entry flange 28 which mates with the exit flange 30 of the atomizer 12 and an exit flange 32 which mates with the entry flange 34 of the mixing tube 36. When properly designed the atomizer head 20 may be formed economically from a single sheet of steel rolled to form a cone which is subsequently cut along planes oblique to the cone axis. Alternate sections may then be rotated 180° about the cone axis and the conic sections welded together to form an elbow. In addition to providing an inexpensive and flexible design, the design is aerodynamically sound and minimizes the loss of pressure head during passage of the gas through the system.

The mixing tube 36 is a generally cylindrical elongated tube formed from steel and may be provided with reinforcing flanges 38, if desired. Other materials, such as fiberglass or plastics may be utilized for the mixing tube depending upon the temperature and chemical composition of the gases flowing therethrough. In some cases it may be desirable to utilize stainless steel construction throughout the system.

The exit end of the mixing tube 36 is provided with an exit flange 40 which mates with the entry flange 42 of the droplet accelerator designated generally at 44. The droplet accelerator 44 communicates with twin cyclones indicated generally at 46 which are identical except that the flow in one member of the pair is clockwise (viewed from above as in FIG. 4) while the flow in the other is counterclockwise.

Cyclones 46 include a generally cylindrical body 48 and a stack 50 of somewhat smaller diameter. The stack 50 is connected to the cyclone body by an annular flange 52 and reinforcing plates 54. A portion of the cyclone stack 50 extends into the cyclone body 48. Preferably the bottom edge of the cyclone stack is formed as a skirt 56 to inhibit reentrainment of liquid into the cleaned gases exiting from the cyclone. The cyclones 46 may be provided with access openings 58 and are mounted on legs 60 attached to a reinforcing flange 62 affixed to the cyclone body 48. The bottom 64 of the cyclone body is in the form of an inverted cone or spherical section with a drain 66 located at the apex.

The steam and water ejector nozzle 68 is located in the atomizer head 20 along the axis of the mixing tube 38. A steam supply line 70 containing an adjustable steam throttling valve 72 communicates with a steam delivery duct 74 and is affixed to a flanged fitting 76 attached to the atomizer head 20. A water supply line 78 containing an adjustable valve 80 communicates with a water duct 82 and is affixed to the flanged fitting 76. As described in more detail in the Martin et al. application Ser. No. 302,608 referred to above, steam delivered through the steam duct 74 expands through the axially positioned steam portion of the steam and water ejector nozzle 68 to form an expanding jet of steam within the mixing tube 36. Water delivered through the water duct 82 is jetted from a series of atomizing ports located circumferentially around the steam portion of the steam and water ejector nozzle 68 to form a series of atomized water jets directed obliquely toward the axis of the steam jet.

Upon striking the steam jet, the atomized circumferential water jets are further atomized by the steam jet and form an expanding turbulent mixture of steam and water 84. As the steam exits the nozzle 68 at a supersonic velocity while the water jets are at a lower velocity the mixture will be highly turbulent and various shock wave patterns including both normal and oblique shock waves will be formed. Immediately downstream of the nozzle 68, the steam and water jet 84 will begin to entrain the contaminated gas passing through the atomizer 12. It will be appreciated that all of the contaminated gas passing through the atomizer 12 will necessarily be entrained by and mixed with the turbulent steam and water jet 84. Thus, the steam and water ejector here provided functions both as a driving means and as a highly effective mixing device. If chemical reagents, such as lime, caustic, ammonia or combinations of these reagents are introduced into the water supply line 78, chemical reactions may be induced within the mixing tube 36 between the components of the steam and water jet 84 and the contaminated gas entrained and mixed with it.

At some point intermediate the ends of the mixing tube 36, the steam and water jet 84 strikes the interior walls of the mixing tube 36 and firmly attaches thereto to a point known as the hook-up point. In the region of the hook-up point, it is believed that a final shock wave will be formed and that thereafter the mixture of steam, water and gas will be moving at a subsonic velocity.

Figure 4:
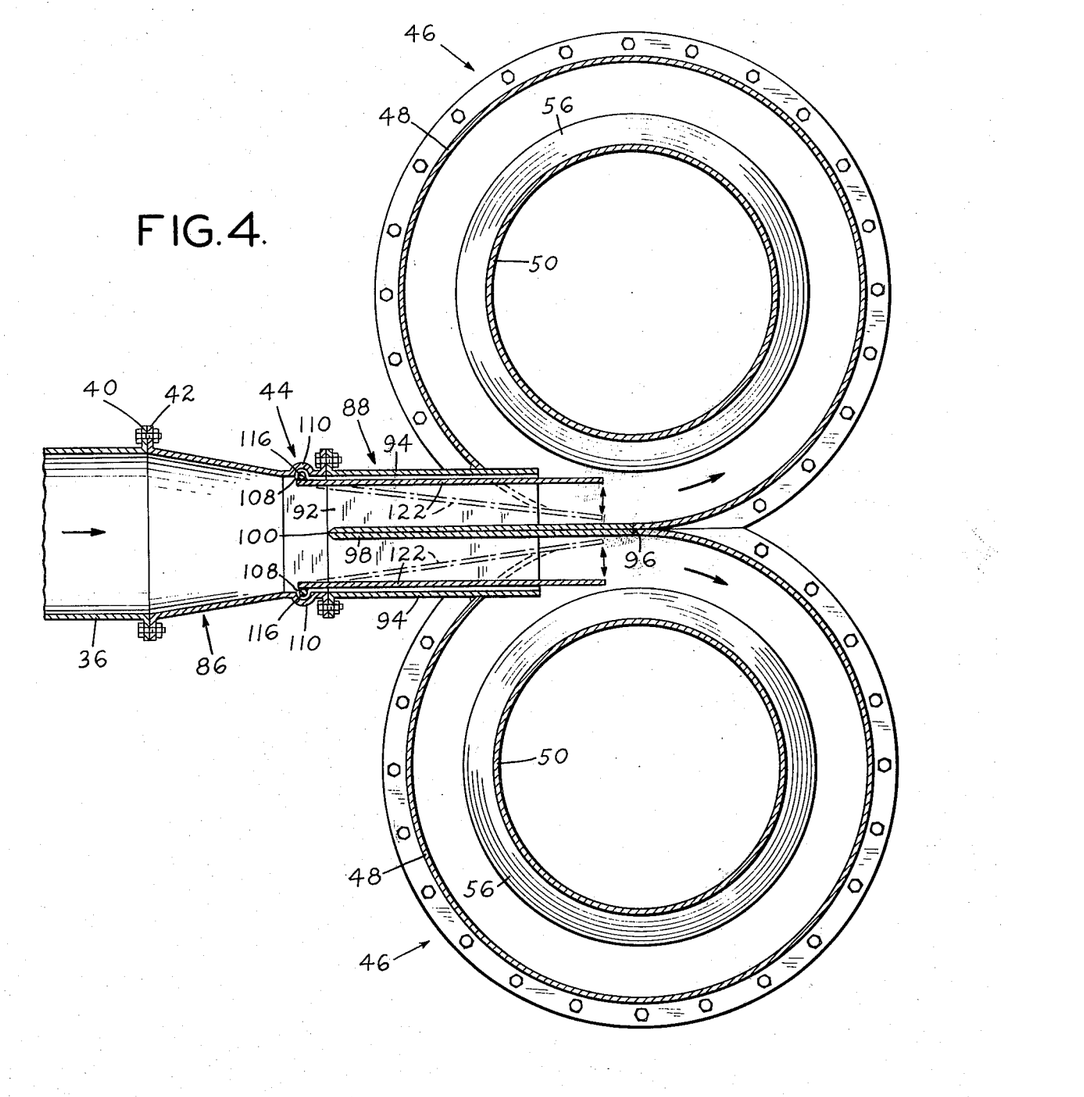
FIG. 4 is a partial plan view in section of the improved steam ejector cleaning system showing the improved cyclone entry and the droplet accelerator taken along line 4—4 of FIG. 1.
Figure 5:
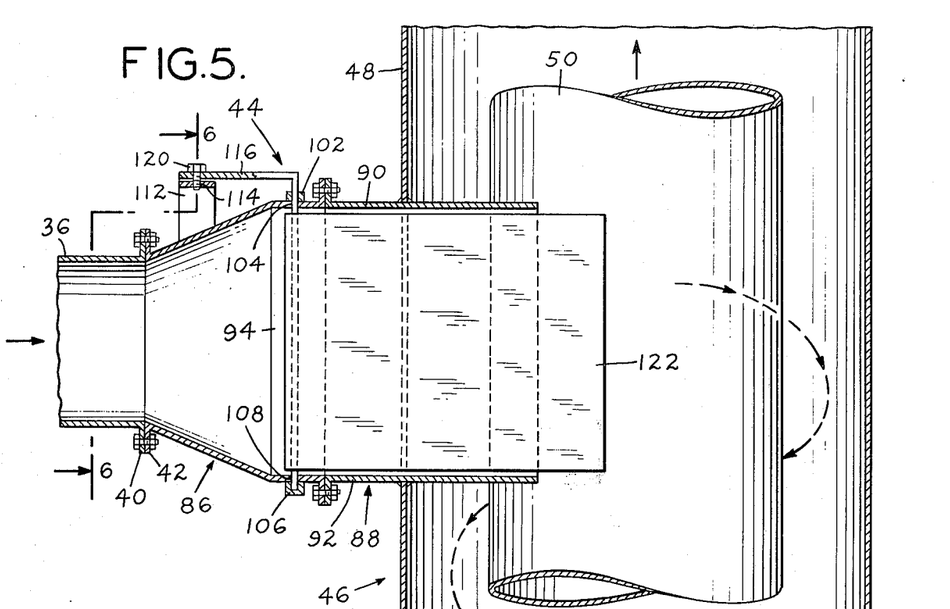
FIG. 5 is a partial elevational view in section of the improved steam ejector cleaning system showing the droplet accelerator taken along line 5—5 of FIG. 3.
Figure 6:
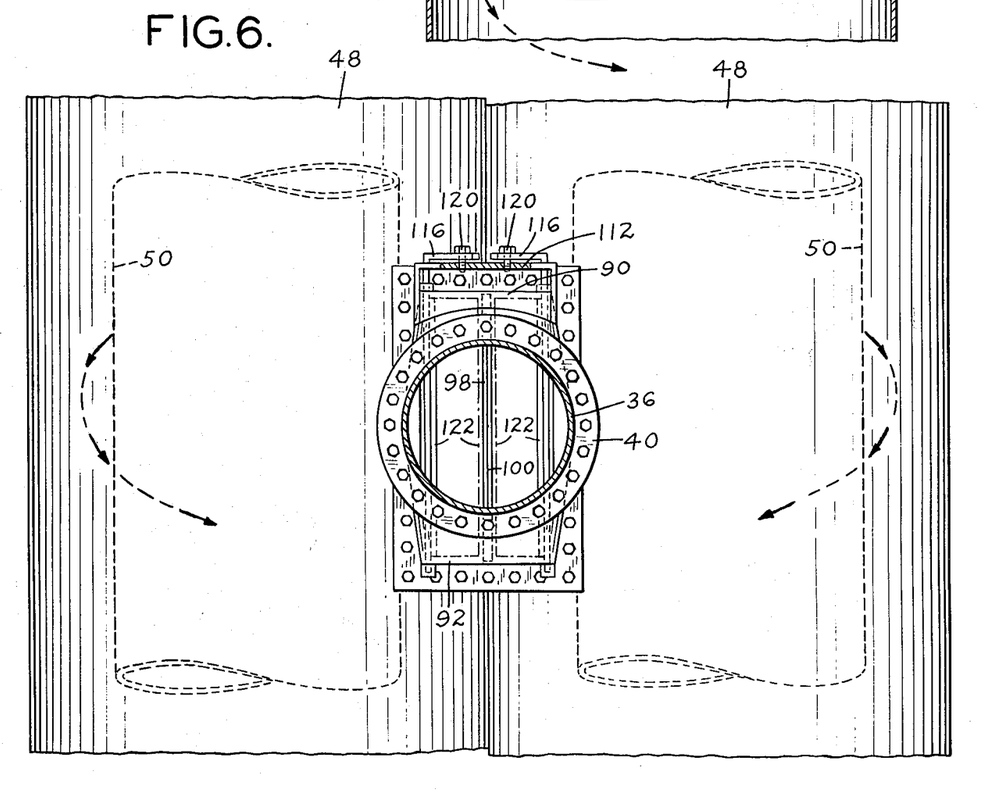
FIG. 6 is an enlarged view similar to FIG. 2 taken along line 6—6 of FIG. 5.

The droplet accelerator 44 is positioned at the end of the mixing tube 36 and immediately in advance of the twin cyclones 46. Referring particularly to FIGS. 4 and 5 which show, respectively, sectional plan and elevational views of the droplet accelerator, the device comprises first a transition section 86 which converges in the horizontal plane but diverges in the vertical plane. As shown most clearly in FIG. 6, the cross section of the transition section 86 varies from a circular cross section congruent with that of the mixing tube 36 to a rectangular cross section having a width less than the internal diameter of the mixing tube but a height substantially greater than the diameter of the mixing tube. A rectangular duct section 88 communicates between the transition section 86 and the bodies 48 of the twin cyclones 46. The rectangular duct section 88 is comprised of top and bottom panels 90 and 92 and a pair of side panels 94. As shown in FIGS. 4 and 5 the top and bottom panels 90 and 92 are shaped to match the interior contour of the bodies 48 of the twin cyclones 46 which have been cut out to accept duct section 88. The side panels 94 of the rectangular duct section 88 are rectangular in shape and extend within the bodies 48 of the twin cyclones 46. The rectangular duct section 88 is preferably welded to the bodies 48 of the twin cyclones 46 to form a structurally sound connection therewith. The top and bottom panels 90 and 92 of the rectangular duct section 88 extend approximately to a point 96 which is on a line joining the centers of the twin cyclones 46.

A divider panel 98, preferably comprising two plates each approximately the same thickness as the walls of the cyclone body 48 is welded to the body 48 of each of the twin cyclones 46. The divider panel 98 extends toward the mixing tube 36 and terminates at a free end 100 near the end of the rectangular duct section 88 where that duct meets the transition section 86. The two plates forming the divider panel are welded together at the free end 100 and the weld may be ground to form a knife edge in order to promote laminar flow through the rectangular duct section 88 in a direction substantially tangential to the cylindrical cyclone body 48.

Sleeve journals 102 are mounted on the top of the transition section 86 concentric with bores 104 formed in the transition section and substantially aligned with the side panels 94 and adjacent the outlet end of the transition section 86. Similarly, thrust journals 106 are mounted on the bottom of the transition section 86 concentric with bores 108 formed in the bottom of the transition section and substantially in vertical alignment with the corresponding sleeve journals 102. Channels 110 are formed in the sides of the transition section 86 to provide clearance for the bores 104 and 108.

A locking bar 112 is affixed to the top surface of the transition section 86. The top surface of the locking bar 112 is flat and parallel to but displaced from the upper surface of the top rectangular duct panel 90. A plurality of threaded bores 114 are formed in the top surface of the locking bar 112 along circular arcs centered respectively on the bores 104. L-shaped control arms 116 are positioned for oscillatory movement within the journals 102, 106 so that the horizontal arms of the control arms 116 are adjacent to the upper surface of the locking bar 112. Bores are formed in the control arms 116 in registry with the threaded bores 114 of the locking bar 112 to receive locking bolts 120.

Figure 3:
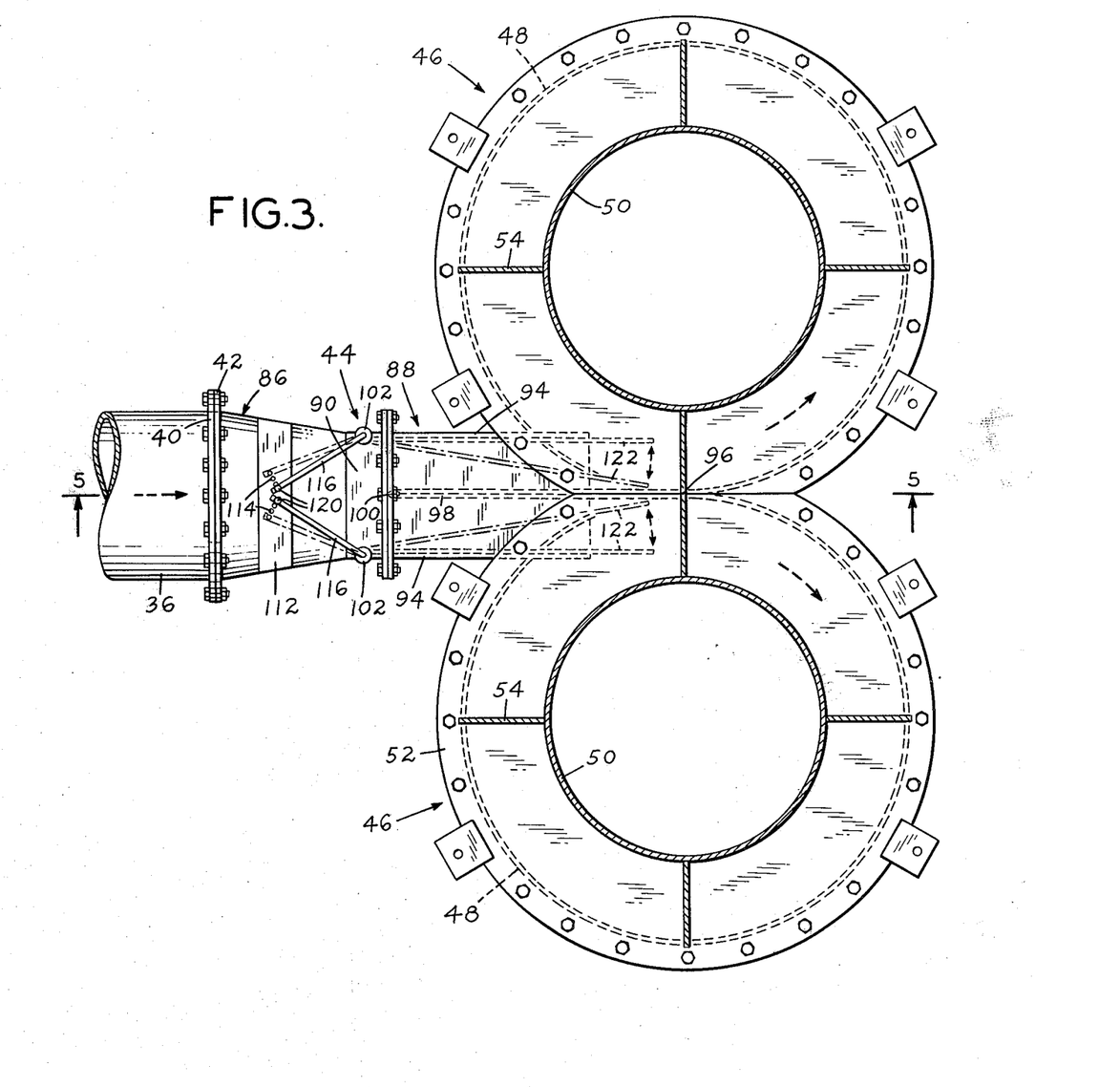
FIG. 3 is a partial plan view of the improved steam ejector cleaning system taken along line 3—3 of FIG. 1.

Guide vanes 122 are affixed, preferably by welding, to each control arm 116. With reference to FIGS. 3 and 4 it will be appreciated that the guide vanes 122 are lockably adjustable from an open position substantially parallel to the side panels 94 to a closed position (indicated by interrupted lines in FIGS. 3 and 4) substantially contiguous to the divider panel 98. Various intermediate positions may be provided as desired.

In the full open position of the guide vanes 122 (indicated by solid lines in FIG. 4) the cross sectional area of the rectangular duct section will be greater than the cross section area of the mixing tube 36 whereby the velocity of the mixture of gas, vapor and water will be decreased prior to entry into the cyclones 46. However, as the guide vanes 122 are progressively moved toward the closed position, the area at the exit end of the rectangular duct section will be decreased and the velocity at the entrance to the cyclones will be increased. At the same time, the mean distance of the gas, vapor and water mixture stream from the curved inner surface of the cyclone will be decreased so as to improve the separating efficiency of the cyclone. Simultaneously, the divider panel 98 acts to split the flow accurately and evenly between the pair of cyclones 46. As the guide vanes 122 approach the divider panel 98, the combination of the vanes and panel become more effective as a straightening device and tends to produce more nearly laminar and tangential flow at the entrance to the cyclone 46.

It will be appreciated by those skilled in the art that with the accelerator device of the present invention, the velocity of flow at the entrance of the cyclone may be adjusted over a wide range to produce and maintain the optimum separating efficiency despite changes which may occur from time to time in the mass rate of flow or the volume of flow in the system. Changes in mass rate may be caused, for example, by an increase in the capacity of the industrial process being serviced or an increased rate of operation of an existing process. A volume change may be caused, for example, by a change in the temperature of the gas. In the present case, both temperature and mass rate of flow changes could result from shutting off the water flowing from the nozzles 22 in the atomizer 12.

Although only a manual guide vane control system has been illustrated and described, it will be apparent to those skilled in the art that an automatic control system could be provided. For example, double action hydraulic control cylinders could be used to position the control arms 116 in response to a signal proportional to the flow or pressure within the mixing tube 36.

As an illustrative example of the present invention, the following dimensions of the major portions of the cleaning system are applicable to a system designed to accommodate a gas flow of about 2000 pounds per minute:

| | |
|---|---|
| Atomizer, outside diameter | 72" |
| Atomizer, height | 15'0" |
| Mixing tube, inside diameter | 23.5" |
| Mixing tube, length | 20'0" |
| Droplet accelerator, inside section | 16" × 36" |
| Droplet accelerator, vane length | 42" |
| Cyclone body, outside diameter | 66" |
| Cyclone body, height | 22'1" |
| Cyclone stack, outside diameter | 42" |
| Cyclone stack, height | 23'5" |
| Cyclone stack, height above body | 15'0" |

While the present invention has been described in connection with a steam ejector cleaning system wherein supersonic steam velocities are produced, it will be appreciated that the invention can also be applied to other cleaning systems such as that disclosed in the Ewan et al. application Ser. No. 291,007 referred to above wherein the ejector fluid is pressurized hot water instead of pressurized steam or systems involving the flow of fluids from a duct into a centrifugal separator.

The specific embodiments discussed above and other detailed information set forth herein are illustrative only and such modifications and alterations thereof as would be apparent to one skilled in the art are deemed to fall within the scope of the invention as defined by the claims appended hereto.

What is claimed is:

1. Apparatus for the removal of contaminant materials such as particulate matter and gaseous substances from a stream of gas comprising: a mixing tube, means comprising a steam and water ejector nozzle for forming a moving jet comprising a mixture of steam and aqueous droplets in said mixing tube to drive a gas containing at least one contaminant material through said mixing tube and to form therein a moving stream comprising a turbulent mixture of said gas and said contaminant material with said steam and said aqueous droplets, in which mixture said aqueous droplets by contact with said contaminant material remove said contaminant material from said gas, a pair of centrifugal separators each having a cylindrical wall for collecting and removing said aqueous droplets from said moving stream, means comprising a plurality of generally planar walls defining two separate passageways respectively connecting the interior of said mixing tube with the interiors of said pair of centrifugal separators for conducting said moving stream from said mixing tube and splitting said stream into two separate streams conducted respectively to said centrifugal separators, and for imparting to each of said moving streams as it enters the associated separator a rectangular cross section having its narrow dimension normal to said cylindrical wall of said associated separator, and said planar walls also including two adjustable guide vanes, each of said guide vanes extending from said mixing tube into one of said separators and being movable for varying the narrow dimension of one of said moving streams to individually control the velocities at which said moving streams respectively enter the associated centrifugal separators.

2. Apparatus for the removal of contaminant materials such as particulate matter and gaseous substances from a stream of gas comprising: a mixing tube, means comprising a steam and water ejector nozzle for forming a moving jet comprising a mixture of steam and aqueous droplets in said mixing tube to drive a gas containing at least one contaminant material through said mixing tube and to form therein a moving stream comprising a turbulent mixture of said gas and said contaminant material with said steam and said aqueous droplets, in which mixture said aqueous droplets by contact with said contaminant material remove said contaminant material from said gas, a pair of centrifugal separators each having a cylindrical wall for collecting and removing said aqueous droplets from said moving stream, means comprising a plurality of generally planar walls defining two separate passageways respectively connecting the interior of said mixing tube with the interiors of said pair of centrifugal separators for conducting said moving stream from said mixing tube and splitting said stream into two separate streams conducted respectively to said centrifugal separators, and for imparting to each of said moving streams as it enters the associated separator a rectangular cross section having its narrow dimension normal to said cylindrical wall of said associated separator, said planar walls including a divider having a planar surface extending from said mixing tube to one of said separators and a planar surface extending from said mixing tube to the other of said separators and each of said planar surfaces being substantially in a plane tangent to the cylindrical wall of the associated separator, and said planar walls also including two adjustable guide vanes, each of said guide vanes extending from said mixing tube into one of said separators and being movable toward and away from one of said planar surfaces of said divider for varying the narrow dimension of one of said moving streams to individually control the velocities at which said moving streams respectively enter the associated centrifugal separators.

* * * * *

UNITED STATES PATENT OFFICE
CERTIFICATE OF CORRECTION

PATENT NO. : 3,912,469

DATED : October 14, 1975

INVENTOR(S) : Thomas K. Ewan and Malley R. Bass

It is certified that error appears in the above–identified patent and that said Letters Patent are hereby corrected as shown below:

Col. 7, line 9   "to"   should be   --at--

Col. 9, line 5   "15'0""   should be   --16'0"--

Signed and Sealed this tenth Day of February 1976

[SEAL]

Attest:

RUTH C. MASON
Attesting Officer

C. MARSHALL DANN
Commissioner of Patents and Trademarks